United States Patent
Lin et al.

(10) Patent No.: US 10,436,254 B1
(45) Date of Patent: Oct. 8, 2019

(54) LINEAR GUIDEWAY CAPABLE OF DETECTING ABNORMAL CIRCULATION STATE

(71) Applicant: HIWIN TECHNOLOGIES CORP., Taichung (TW)

(72) Inventors: Chia-Yu Lin, Taichung (TW); Yeh-Wei Lin, Taichung (TW); Lung-Yu Chang, Taichung (TW); Pin-Ju Huang, Taichung (TW); Stephanie Chun-Ming Yang, Taichung (TW); Zing-Ping Liu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 16/254,075

(22) Filed: Jan. 22, 2019

(51) Int. Cl.
*F16C 29/06* (2006.01)
*F16C 41/00* (2006.01)

(52) U.S. Cl.
CPC .......... *F16C 41/00* (2013.01); *F16C 29/0685* (2013.01); *F16C 2233/00* (2013.01)

(58) Field of Classification Search
CPC ....... F16C 29/06; F16C 29/0685; F16C 41/00
See application file for complete search history.

(56) References Cited

U.S. PATENT DOCUMENTS

| 7,178,981 | B2 | 2/2007 | Rudy et al. |
| 7,410,299 | B2 * | 8/2008 | Rudy ..................... G01L 5/0019 384/8 |
| 2007/0237435 | A1 * | 10/2007 | Nagao ................... F16C 29/043 384/44 |

FOREIGN PATENT DOCUMENTS

| JP | 2008303953 A | * 12/2008 | .............. F16C 29/00 |
| JP | 2012193803 A | 10/2012 | |

* cited by examiner

Primary Examiner — Thomas R Hannon
(74) Attorney, Agent, or Firm — Muncy, Geissler, Olds & Lowe, P.C.

(57) ABSTRACT

A linear guideway includes a rail, a slider disposed on the rail, and a load passage formed between the rail and the slider. The slider has two non-load passages. Besides, a first end cap and a second end cap are disposed on two opposite end surfaces of the slider respectively. The first end cap has two first circulation grooves. The second end cap has a circulation member and a seal sheet. The circulation member has two second circulation grooves. The load passage, non-load passage, first circulation groove and second circulation groove collectively form a circulation channel for balls to move therein. A force sensor is disposed between the circulation member and the seal sheet. As a result, through the rigidity difference between the first and second end caps accompanied with the force sensor, it can be determined that if there is an abnormal circulation state.

5 Claims, 7 Drawing Sheets

LINEAR GUIDEWAY CAPABLE OF DETECTING ABNORMAL CIRCULATION STATE

BACKGROUND OF THE INVENTION

1. Field of the Invention

The present invention relates to linear guideways and more particularly, to a linear guideway capable of detecting an abnormal circulation state.

2. Description of the Related Art

The traditional linear guideway includes a rail and a slider slidably mounted on the rail, wherein the slider is provided at each of the front and rear ends thereof with an end cap in a way that the rail, the slider and the two end caps collectively form a pair of circulation channels therebetween for a plurality of balls to move therein.

For ensuring smooth motion of the balls, there have been related prior arts employing sensors to sense if there is an abnormal circulation state. For example, in U.S. Pat. No. 7,178,981, sensors are employed to sense the variation of the force between the end caps and the slider. However, because two ends of the slider both need to be provided with the sensor and each end cap has a certain rigidity, it is actually uneasy to be accurately sensed that a problem happens to the end cap. Besides, in Japan Patent No. JPA_2012193803, the sensor is disposed outside the end cap. When the end cap is over-expanded and thereby in contact with the sensor, it can be determined that an abnormality happens to the end cap. In such manner, however, the sensor should be installed at a specific position and that needs precise adjustment to attain the expected effect.

SUMMARY OF THE INVENTION

It is a primary objective of the present invention to provide a linear guideway which can detect if there is an abnormal circulation state in real time.

To attain the above-mentioned primary objective, the linear guideway of the present invention includes a rail, a slider, a first end cap, a second end cap, a plurality of balls, and a force sensor. The rail is provided on the peripheral surface thereof with two external roll grooves opposite to each other. The slider has a first end surface, a second end surface opposite to the first end surface, and a slide groove penetrating through the first end surface and the second end surface. The slider is slidably disposed on the rail through the slide groove and provided on the inner wall thereof with two internal roll grooves opposite to each other. The internal roll grooves of the slider are corresponding to the external roll grooves of the rail respectively so that the internal roll grooves of the slider and the external roll grooves of the rail form two load passages. Besides, the slider further has two non-load passages opposite to each other. Each of the non-load passages penetrates through the first end surface of the slider and the second end surface of the slider. The first end cap is disposed on the first end surface of the slider, and the first end cap is provided in an integrated manner with two first circulation grooves opposite to each other. Each of the two first circulation grooves is communicated with one end of one said load passage and one end of one said non-load passage. The second end cap has a cap body, a circulation member and a seal sheet. The cap body is disposed on the second end surface of the slider. The circulation member is disposed in the cap body and has two second circulation grooves opposite to each other. Each of the two second circulation grooves is communicated with the other end of one said load passage and the other end of one said non-load passage in a way that the load passage, the non-load passage, one said first circulation groove and one said second circulation groove collectively form a circulation channel for the balls to move therein. The force sensor is disposed between the circulation member of the second end cap and the seal sheet of the second end cap for sensing the force-receiving state of the second end cap when the second end cap is impacted by the balls.

It can be known from the above description that the first end cap is an integrated structure, and the second end cap is a multi-piece structure. In the linear guideway of the present invention, through the rigidity difference between the first end cap and the second end cap and the force sensor disposed on the circulation member of the second end cap, the force received by the second end cap when the second end cap is impacted by the balls can be accurately sensed, so that it can be effectively determined in real time that if there is an abnormal circulation state.

Further speaking, the circulation member has a main body and two extending portions opposite to each other. The two extending portions extend from the internal end surface of the main body integrally and each provided with one said second circulation groove. As to the force sensor, it is disposed on the external end surface of the main body; for example, it is disposed correspondingly in position to the two second circulation grooves and thereby able to sense the signal of the force received at the turning point of each circulation channel. Alternatively, the force sensor may be configured with the same shape with the main body, so that the force sensor can cover the external end surface of the main body except for the top edge thereof, that can increase the sensing range and raise the accuracy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

First of all, it is to be mentioned that throughout the entire specification, including the following embodiments and claims, the nouns related to directionality are based on the direction in the figures. Besides, in the following embodiments and the appendix drawings, same reference numerals designate same or similar elements or the structural features thereof.

Figure 1:
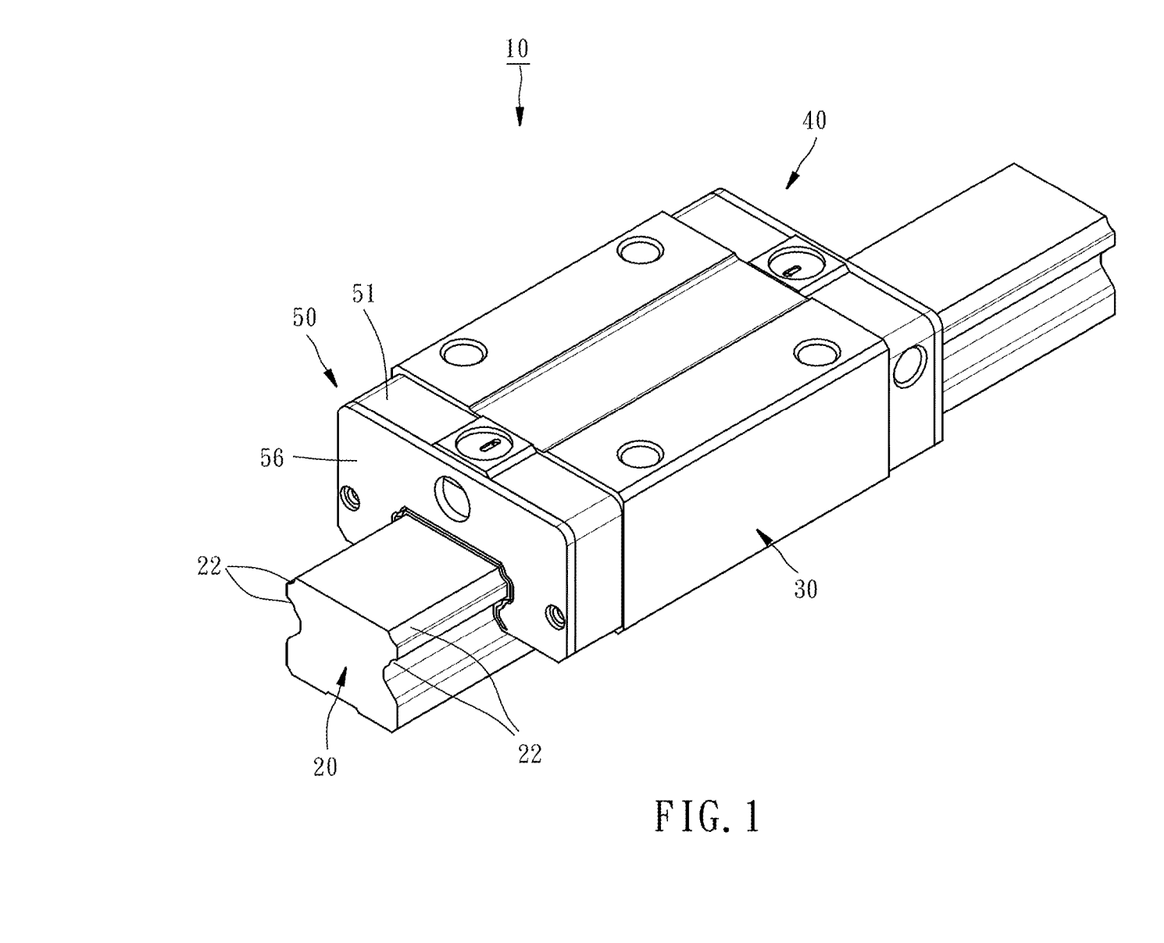
FIG. 1 is a perspective view of the appearance of a linear guideway of a first embodiment of the present invention.
Figure 2:
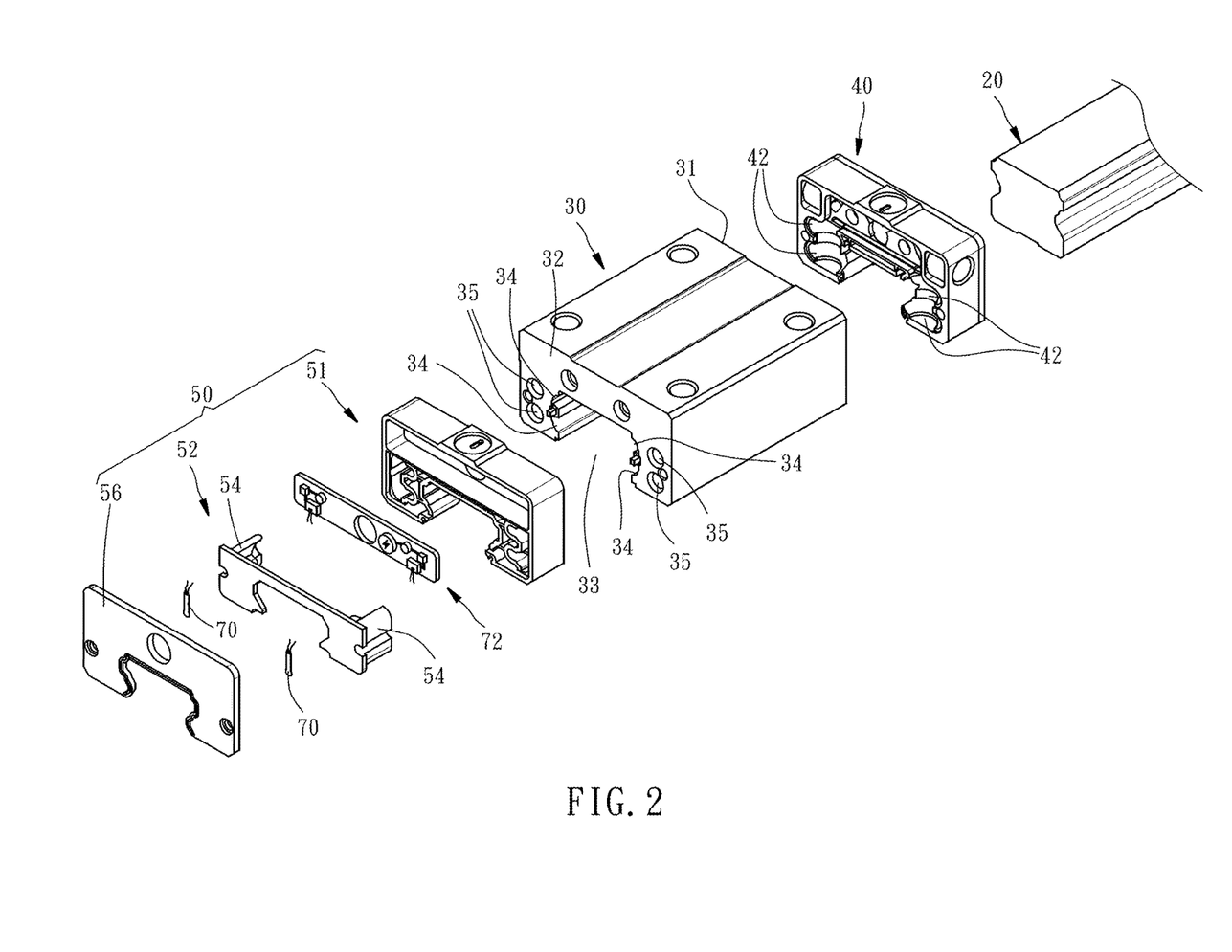
FIG. 2 is an exploded perspective view of the linear guideway of the first embodiment of the present invention, but not showing balls thereof.
Figure 4:
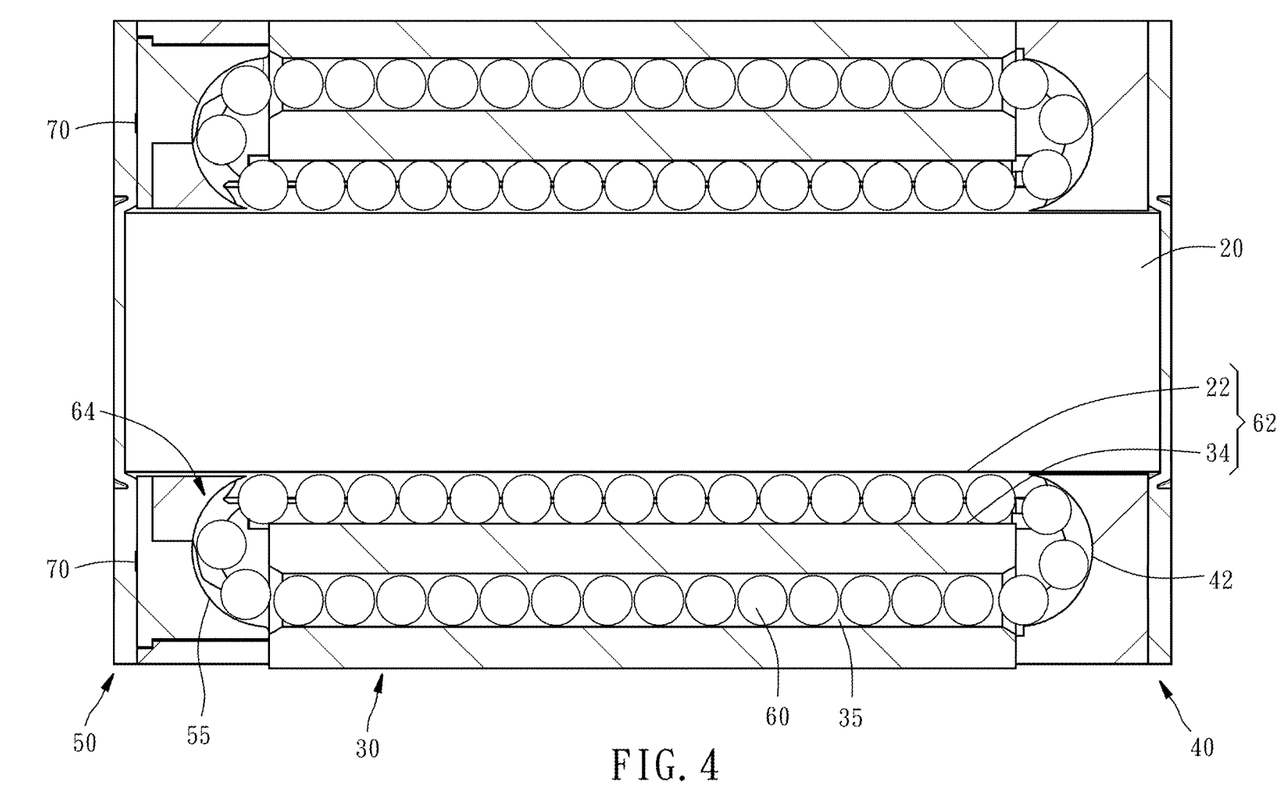
FIG. 4 is a sectional view of the linear guideway of the first embodiment of the present invention.

Referring to FIGS. 1, 2 and 4, the linear guideway 10 of the first embodiment of the present invention includes a rail 20, a slider 30, a first end cap 40, a second end cap 50, a plurality of balls 60, and two force sensors 70.

The rail 20 is provided on each of two opposite sides thereof with two external roll grooves 22 located one above the other.

The slider 30 has a first end surface 31, a second end surface 32 opposite to the first end surface 31, and a slide groove 33 penetrating through the first end surface 31 and the second end surface 32. The slider 30 is disposed on the rail 20 through the slide groove 33 in a way that the slider 30 is slidable along the rail 20. The slide groove 33 is provided on each of two opposite sides of the inner wall thereof with two internal roll grooves 34 located one above the other. The internal roll grooves 34 of the slider 30 are located correspondingly to the external roll grooves 22 of the rail 20, so that a load passage 62 as shown in FIG. 4 is formed between each internal roll groove 34 and the external roll groove 22 located correspondingly thereto. Besides, the slider 30 is provided on each of two opposite outsides of the slide groove 33 with two non-load passages 35 located one above the other. Each of the non-load passages 35 penetrates through the first end surface 31 of the slider 30 and the second end surface 32 of the slider 30.

The first end cap 40 is an integrated structure. The first end cap 40 is installed on the first end surface 31 of the slider 30 by fasteners such as screws (not shown). Besides, as shown in FIG. 2, the internal end surface of the first end cap 40 is provided on each of two opposite sides thereof with two first circulation grooves 42 located one above the other. Two ends of the first circulation groove 42 is communicated with one end of the load passage 62 and one end of the non-load passage 35 respectively, as shown in FIG. 4.

The second end cap 50 is a multi-piece structure. Specifically speaking, as shown in FIG. 2, the second end cap 50 has a cap body 51, a circulation member 52 and a seal sheet 56. The cap body 51 is abutted on the second end surface 32 of the slider 30. The circulation member 52 is disposed in the cap body 51 and has a main body 53 and two extending portions 54 opposite to each other. The two extending portions 54 extend from the internal end surface of the main body 53 integrally and each provided with two second circulation grooves 55 located one above the other. Two ends of each second circulation groove 55 are communicated with the other end of the load passage 62 and the other end of the non-load passage 35 respectively (as shown in FIG. 4), so that the first circulation groove 42, second circulation groove 55, load passage 62 and non-load passage 35 collectively form a circulation channel 64 for the balls 60 to move therein, as shown in FIG. 4. The seal sheet 56 is disposed on the external end surface of the cap body 51 in a way that the seal sheet 56 together with the cap body 51 are installed on the second end surface 32 of the slider 30 by fasteners such as screws (not shown) and the seal sheet 56 covers the circulation member 52.

Figure 3:
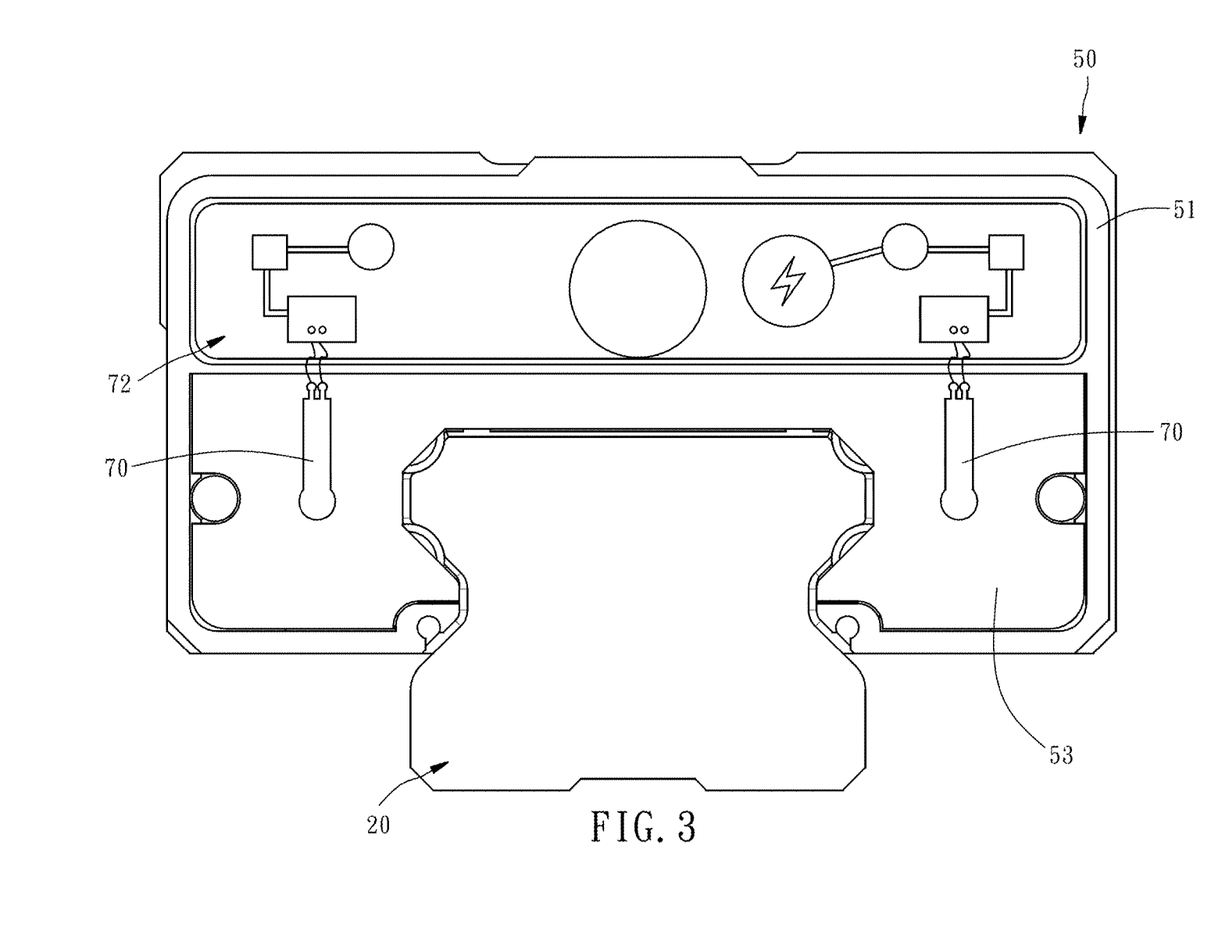
FIG. 3 is a lateral view of the linear guideway of the first embodiment of the present invention, but not showing a seal sheet thereof.

This embodiment has two force sensors 70. As shown in FIGS. 2-4, the two force sensors 70 are disposed between the main body 53 of the circulation member 52 and the seal sheet 56 and each located correspondingly to one second circulation groove 55. In this way, when the circulation member 52 is impacted by the balls 60, the force sensors 70 can sense the force-receiving state of the circulation member 52 in real time.

It can be known from the above description that when the resistance of the motion of the balls 60 has an abnormality, the deformation and displacement of the second end cap 50 will cause the force sensors 70 to be compressed, so that the force sensors 70 will sense a force signal and then transmit the force signal to a control module 72 disposed in the cap body 51 and located above the circulation member 52 for analysis. Such force signal is increased with the increase of the resistance of the motion, and once it exceeds the threshold value, the related component needs a replacement, so that the effect of pre-diagnosing if a circulation problem will happen is attained.

Figure 5:
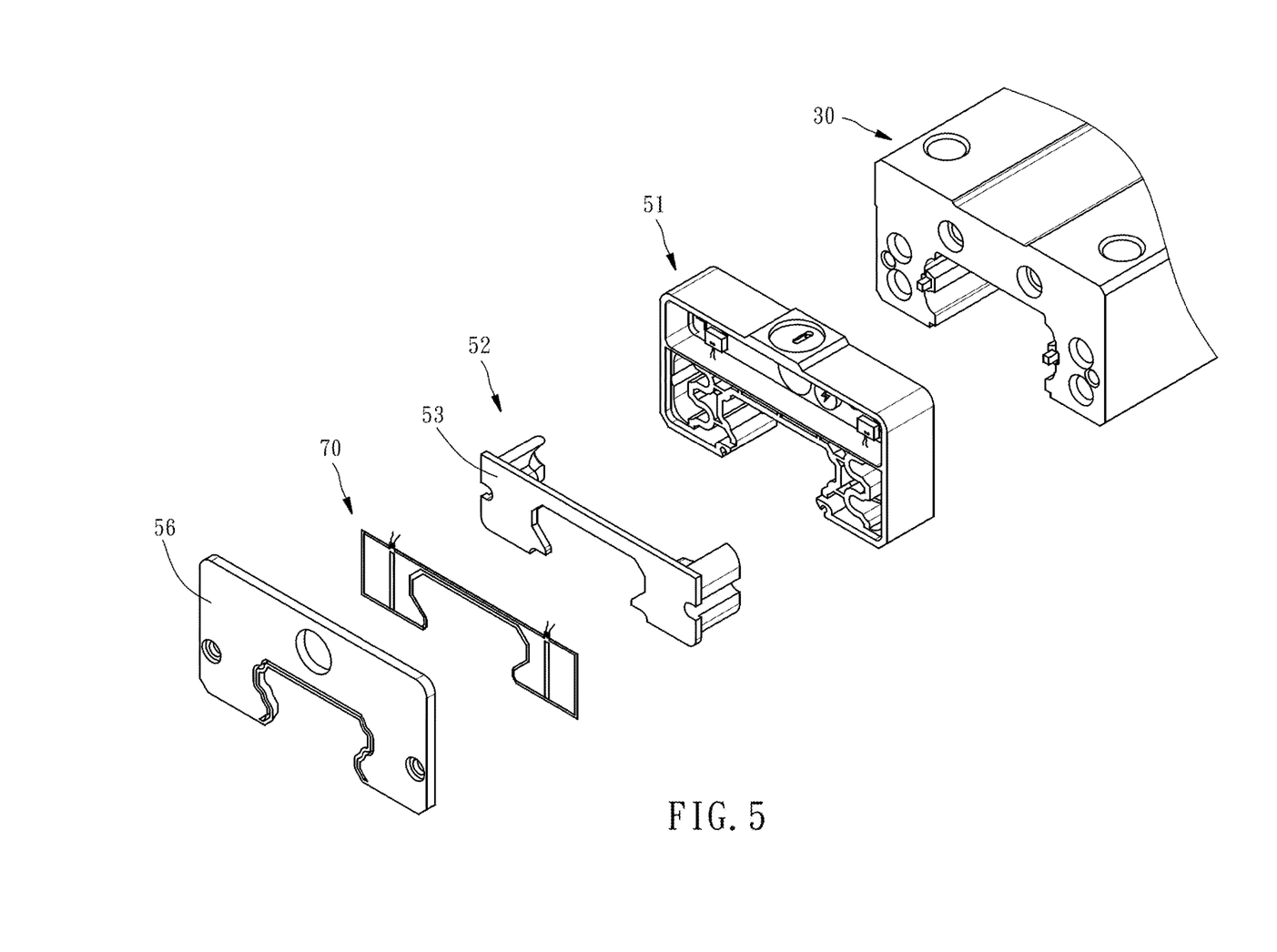
FIG. 5 is a partial exploded perspective view of a linear guideway of a second embodiment of the present invention.
Figure 6:
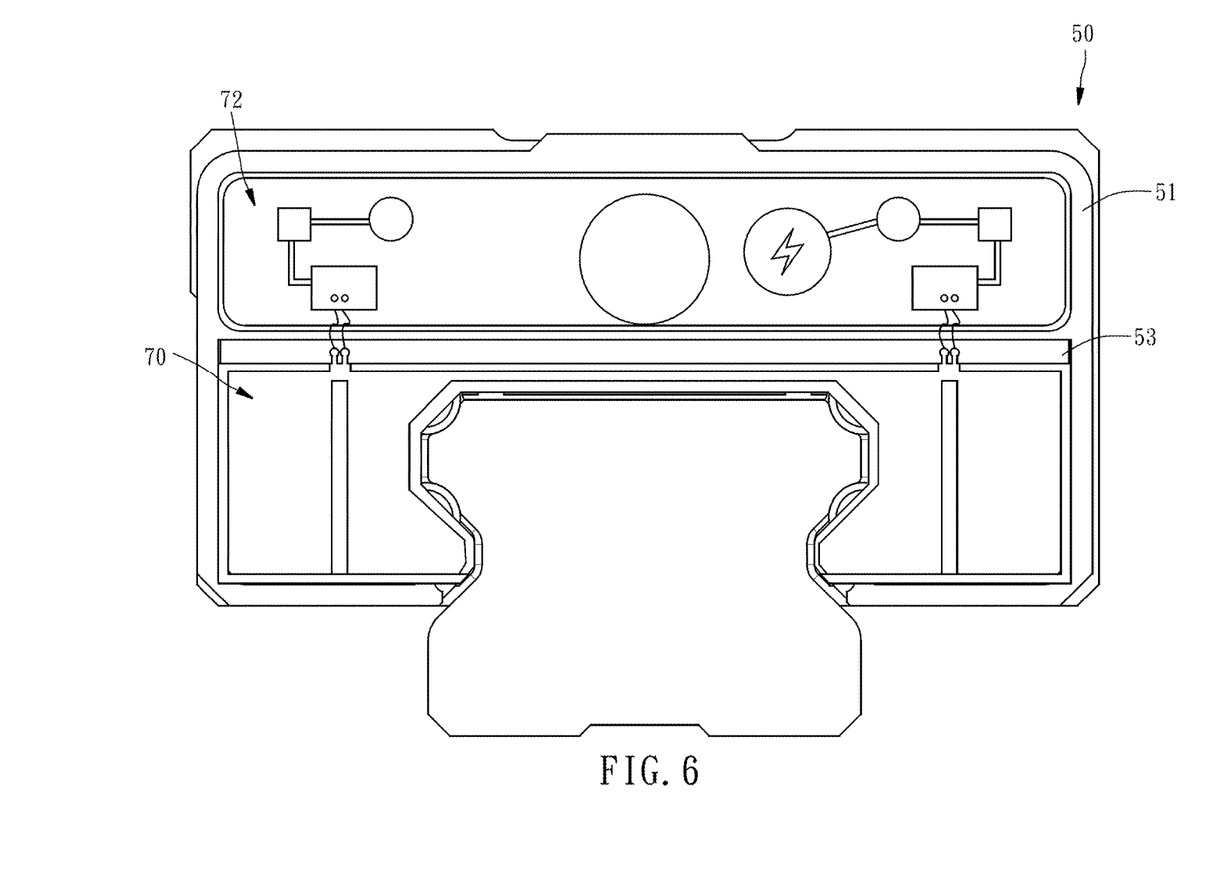
FIG. 6 is a lateral view of the linear guideway of the second embodiment of the present invention, but not showing a seal sheet thereof.
Figure 7:
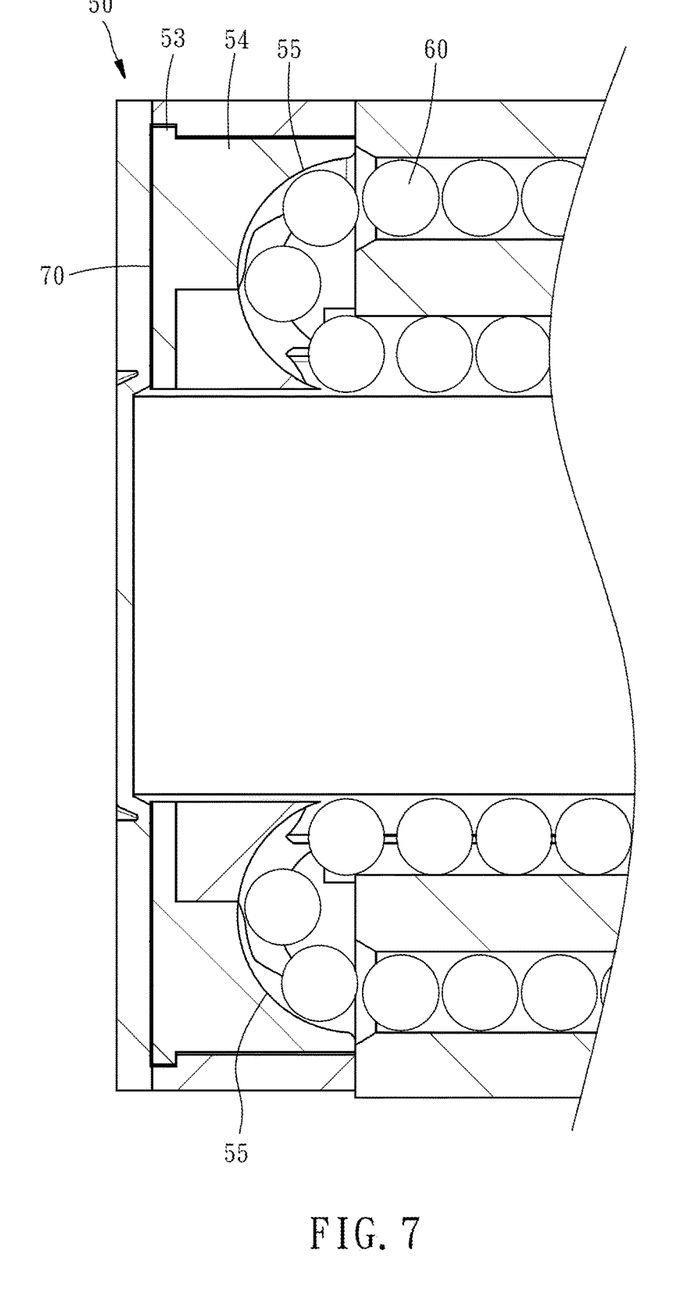
FIG. 7 is a partial sectional view of the linear guideway of the second embodiment of the present invention.

In the above-described first embodiment, the force sensors 70 are disposed correspondingly in position to the second circulation grooves 55. On the other hand, for the second embodiment of the present invention, the two force sensors 70 are integrated into one-piece and configured to be the same in shape with the main body 53 of the circulation member 52, as shown in FIGS. 5-7, so that the force sensor 70 covers the external end surface of the main body 53 except for the top edge thereof, that can increase the sensing range and raise the detecting accuracy.

In conclusion, in the linear guideway 10 of the present invention, through the rigidity difference between the first end cap 40 and the second end cap 50 and the force sensor 70 disposed on the circulation member 52 of the second end cap 50, the impact force received by the second end cap 50 when the motion of the balls 60 is unsmooth is magnified. Compared with the prior arts, the present invention can determine the circulation state more accurately, thereby attaining the effect of pre-diagnosis.

What is claimed is:

1. A linear guideway comprising:
a rail which is provided on a peripheral surface thereof with two external roll grooves opposite to each other;
a slider having a first end surface, a second end surface opposite to the first end surface, and a slide groove penetrating through the first end surface and the second end surface, the slider being slidably disposed on the rail through the slide groove, the slide groove being provided on an inner wall thereof with two internal roll grooves opposite to each other, the internal roll grooves of the slider being located correspondingly to the external roll grooves of the rail so that the internal roll grooves of the slider and the external roll grooves of the rail form two load passages, the slider further having two non-load passages opposite to each other, each of the non-load passages penetrating through the first end surface of the slider and the second end surface of the slider;
a first end cap disposed on the first end surface of the slider, the first end cap having two first circulation grooves opposite to each other, each of the two first circulation grooves being communicated with an end of one said load passage and an end of one said non-load passage;
a second end cap having a cap body, a circulation member and a seal sheet, the cap body being disposed on the second end surface of the slider, the circulation member being disposed in the cap body and having two second circulation grooves opposite to each other, each of the two second circulation grooves being communicated with another end of one said load passage and another end of one said non-load passage in a way that two circulation channels are formed and each of the circulation channels is formed by one said load passage, one said non-load passage, one said first circulation groove and one said second circulation groove collectively, the seal sheet being disposed on the cap body in a way that the seal sheet and the slider are located on two opposite end surfaces of the cap body respectively and the seal sheet covers the circulation member;

a plurality of balls disposed in the two circulation channels; and a force sensor disposed between the circulation member of the second end cap and the seal sheet of the second end cap.

2. The linear guideway as claimed in claim 1, wherein the circulation member has a main body and two extending portions opposite to each other; the two extending portions extending integrally from an internal end surface of the main body and each provided with one said second circulation groove; the force sensor is disposed between the main body and the seal sheet.

3. The linear guideway as claimed in claim 2, wherein the force sensor corresponds in shape to the main body and covers an external end surface of the main body.

4. The linear guideway as claimed in claim 2, wherein two said force sensors are disposed on an external end surface of the main body correspondingly in position to the two second circulation grooves respectively.

5. The linear guideway as claimed in claim 1, wherein the force sensor is electrically connected with a control module which is disposed in the cap body of the second end cap and located above the circulation member.

* * * * *